US009546582B1

(12) United States Patent
Zhang et al.

(10) Patent No.: US 9,546,582 B1
(45) Date of Patent: Jan. 17, 2017

(54) SILENCER PANEL HAVING SECTIONS AND RELATED SILENCER DUCT

(71) Applicant: General Electric Company, Schenectady, NY (US)

(72) Inventors: Hua Zhang, Greer, SC (US); Laxmikant Merchant, Bangalore (IN); Javeed Iqbaluddin Mohammed, Bangalore (IN); Valery Ivanovich Ponyavin, Greenville, SC (US); Dinesh Venugopal Setty, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/855,935

(22) Filed: Sep. 16, 2015

(51) Int. Cl.
*F01N 1/24* (2006.01)
*F02C 7/045* (2006.01)
*G10K 11/16* (2006.01)

(52) U.S. Cl.
CPC ................. *F01N 1/24* (2013.01); *F02C 7/045* (2013.01); *G10K 11/161* (2013.01)

(58) Field of Classification Search
CPC ........... F02C 7/045; F01N 1/24; G10K 11/161
USPC ................................. 181/214, 224, 256, 212
See application file for complete search history.

(56) References Cited

U.S. PATENT DOCUMENTS

| | | | | |
|---|---|---|---|---|
| 5,394,786 A | 3/1995 | Gettle et al. | | |
| 6,260,658 B1 * | 7/2001 | Darrell | F01D 25/30 | 181/224 |
| 8,240,428 B2 * | 8/2012 | Humbad | B60H 1/00028 | 181/212 |
| 2006/0272886 A1 * | 12/2006 | Mueller | F02C 7/045 | 181/224 |
| 2010/0077755 A1 * | 4/2010 | Jangili | F01D 25/30 | 60/725 |
| 2011/0061968 A1 * | 3/2011 | Helenius | F24F 13/24 | 181/224 |
| 2013/0168180 A1 * | 7/2013 | Merchant | F02C 7/045 | 181/214 |

* cited by examiner

*Primary Examiner* — Forrest M Phillips
(74) *Attorney, Agent, or Firm* — Ernest Cusick; Hoffman Warnick LLC

(57) ABSTRACT

A silencer panel section may include an acoustic absorbing material, a first enclosure surrounding the acoustic absorbing material, and a first coupler configured to couple the first enclosure to a second enclosure of an adjacent silencer panel section. A silencer panel may employ a plurality of the sections coupled together to form a single silencer panel. A silencer duct may include a frame forming a working fluid flow path, and a plurality of silencer panel mounts positioned within the frame, each silencer panel mount configured to slidingly receive a silencer panel, such as the silencer panel described herein.

28 Claims, 13 Drawing Sheets

SILENCER PANEL HAVING SECTIONS AND RELATED SILENCER DUCT

BACKGROUND OF THE INVENTION

The disclosure relates generally to acoustic attenuation, and more particularly, to a silencer panel and related silencer duct.

Noise reduction systems are used on a large variety of industrial machines such as turbomachines to reduce the acoustic impact to surrounding areas. In gas turbine systems, for example, noise reduction systems may be employed in the inlet duct, gas turbine enclosures and barrier walls. Traditionally, to attain the necessary acoustic reduction requirements, silencer panels and acoustically treated walls are used in the noisy areas. One mechanism to reduce acoustic impact is to treat walls with acoustic absorbing material. Another mechanism is to place silencer panels in areas where noise reduction is required, such as a working fluid flow path in an intake system duct to prevent noise escaping.

With regard to silencer panels, each panel typically includes an acoustic absorbing material such as mineral/glass wool positioned by a metal supporting member and surrounded by an enclosure including stainless steel perforated sheets on the sides thereof. The sheets are held together by stainless steel end caps. The stainless steel perforated sheets are typically welded to the supporting members that hold the acoustic absorbing material. The perforated stainless steel sheets hold the acoustic absorbing material intact with the supporting members and propagate the sound waves through the perforations into the acoustic absorbing material. Use of stainless steel enclosures presents a number of challenges. For example, the enclosures are very heavy, and are also difficult and costly to manufacture due to the cost of the material and the need for welding to form the panels. In addition, the steel construction must be welded in place to the surrounding duct and must be custom fit for a particular sized duct.

BRIEF DESCRIPTION OF THE INVENTION

A first aspect of the disclosure provides a silencer panel section, comprising: an acoustic absorbing material; a first enclosure surrounding the acoustic absorbing material; and a first coupler configured to couple the first enclosure to a second enclosure of an adjacent silencer panel section.

A second aspect of the disclosure provides a silencer panel comprising: a plurality of sections configured to be coupled together to form a single silencer panel, each section including an acoustic absorbing material within an enclosure surrounding the acoustic absorbing material.

A third aspect of the disclosure provides a silencer duct comprising: a frame forming a working fluid flow path; and a plurality of silencer panel mounts positioned within the frame, each silencer panel mount configured to slidingly receive a silencer panel.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a silencer panel and silencer system including at least one plastic, perforated side wall. In addition, the disclosure includes a silencer panel section or section, a (modular) silencer panel and a silencer duct that may slidingly receive a silencer panel.

Figure 1:
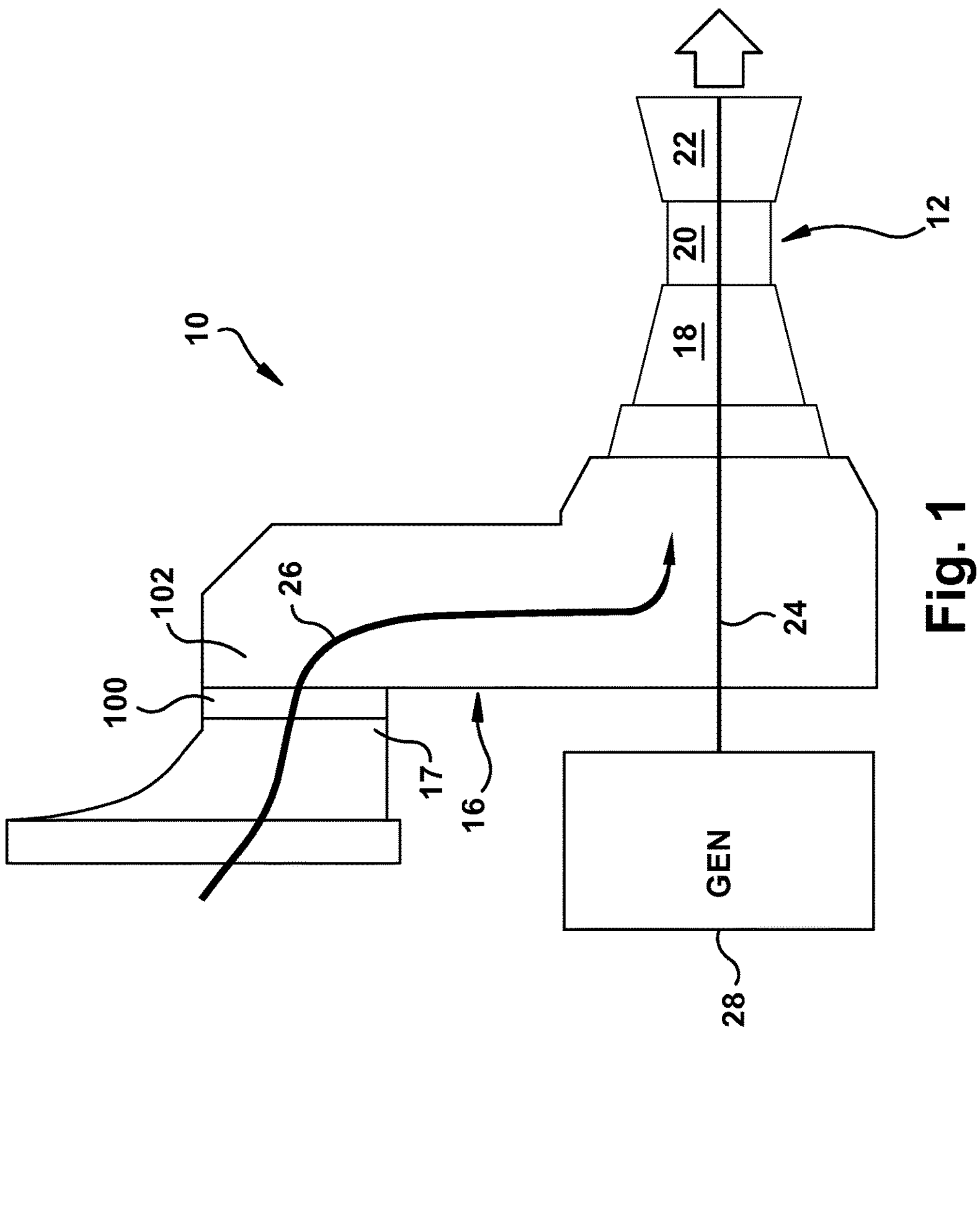
FIG. 1 shows a schematic view of an illustrative industrial machine employing a silencer panel according to embodiments of the disclosure.

Referring to the drawings, FIG. 1 depicts an illustrative industrial machine in the form of a turbomachine system 10 (e.g., simple cycle gas turbine power generation systems) that may include, among other things, a gas turbine system 12. Gas turbine system 12 may combust liquid or gas fuel, such as natural gas and/or a hydrogen-rich synthetic gas, to generate hot combustion gases to drive gas turbine system 12. Gas turbine system 12 includes an air intake section 16, a compressor 18, a combustor component 20, and a turbine component 22. Turbine component 22 is drivingly coupled to compressor 18 via a shaft 24. In operation, air (e.g., ambient air) enters gas turbine system 12 through air intake section 16 (indicated by arrow 26) and is pressurized in compressor component 18. Air intake section 16 may include an intake frame 17 for forming a working fluid flow therein. As illustrated, intake frame 17 is operatively coupled to compressor 18, which includes at least one stage including a plurality of compressor blades coupled to shaft 24. Rotation of shaft 24 causes a corresponding rotation of the compressor blades, thereby drawing air into compressor 18 via air intake section 16 and compressing the air prior to entry into combustor component 20.

Combustor component 20 may include one or more combustors. In embodiments, a plurality of combustors is disposed in combustor component 20 at multiple circumferential positions in a generally circular or annular configuration about shaft 24. As compressed air exits compressor component 18 and enters combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through turbine component 22 flow against and between the turbine blades, thereby driving the turbine blades and, thus, shaft 24 into rotation. In turbine component 22, the energy of the combustion gases is converted into work, some of which is used to drive compressor component 18 through rotating shaft 24, with the remainder available for useful work to drive a load such as, but not limited to, an electrical generator 28 for producing electricity, and/or another turbine. It is emphasized that turbomachine system 10 is simply illustrative of one application in which a silencer panel and system according to embodiments of the invention may be employed. As air flows through air intake system 16, noise is created such that a silencer system 100 and compressor component 18 according to embodiments of the invention is employed to reduce the noise.

Figure 2:
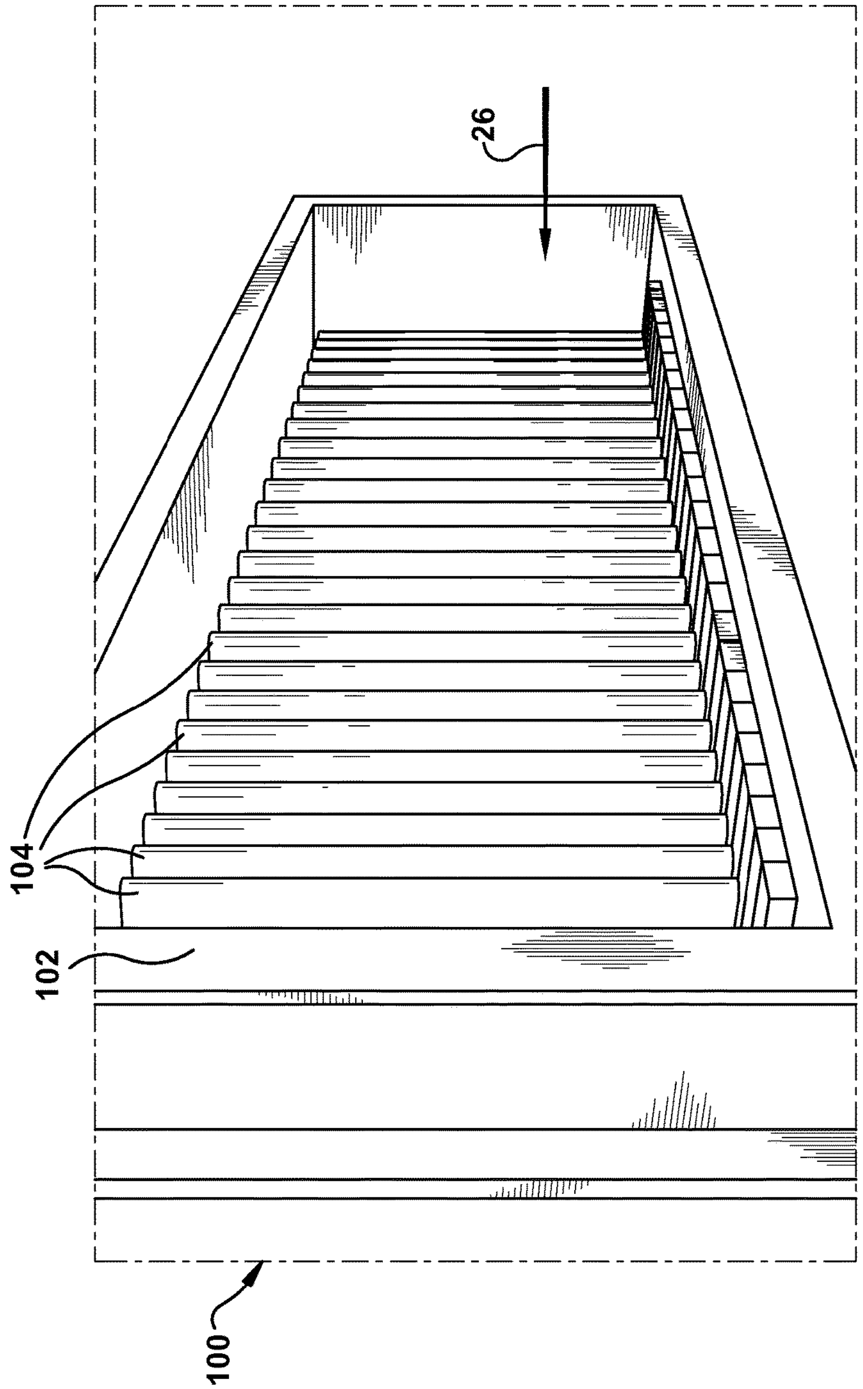
FIG. 2 shows a front perspective view of an intake system frame employing a silencer panel and silencer duct according to embodiments of the disclosure.
Figure 3:
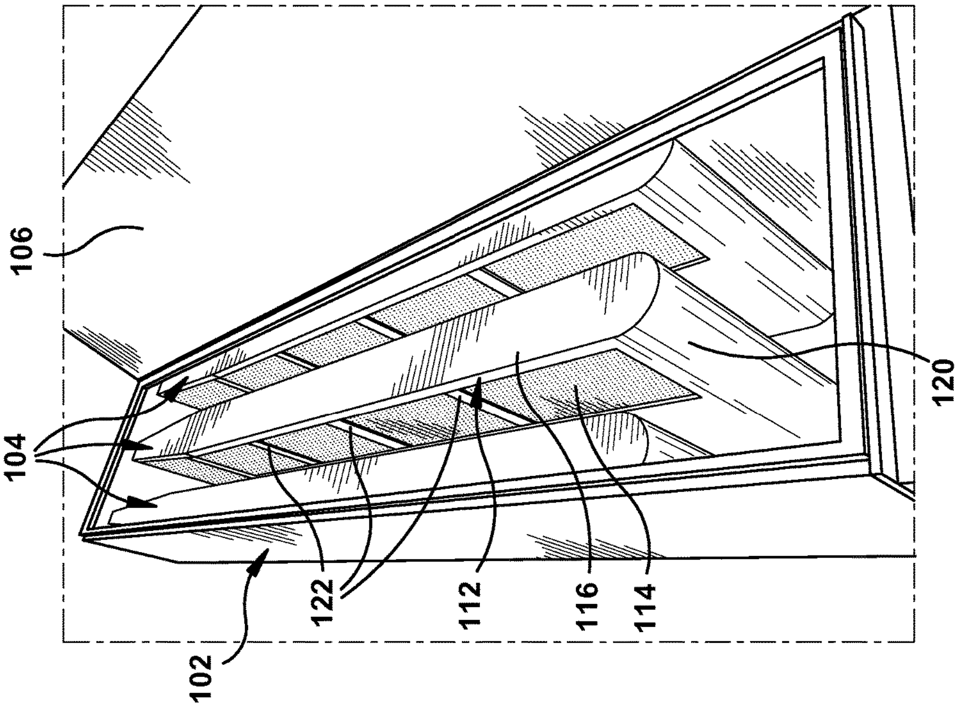
FIG. 3 shows an upper perspective view of a silencer panel according to embodiments of the disclosure in position in a frame with an end panel of the frame removed to reveal the sectioned silencer panels.

FIG. 2 shows front perspective view of a silencer system 100 including a frame or silencer duct 102 (e.g., intake frame 17 (FIG. 1)) forming a working fluid flow path, and FIG. 3 shows an upper perspective view of a silencer panel 104 in position in frame 102 with an end panel 106 of frame 102 open to reveal silencer panels 104. Frame 102 may include any now known or later developed intake frame made of, for example, steel, galvanized steel or other structural metal, and sized for a particular compressor 18 (FIG. 1) and/or industrial machine. As understood, frame 102 can come in a large variety of sizes.

As shown in FIG. 2, a plurality of silencer panels 104 according to embodiments of the invention is positioned within frame 102. The panels may be evenly spaced across a width of the frame. Each silencer panel 104 may be configured to be positioned within frame 102 in a variety of ways, e.g., by fasteners such as screws through end panel 106 (FIG. 3) of frame 102, mating channels, tongue-and-groove mating elements, etc. Each silencer panel 104 may include appropriate structure to accommodate the particular type of positioning mechanism employed.

Figure 4:
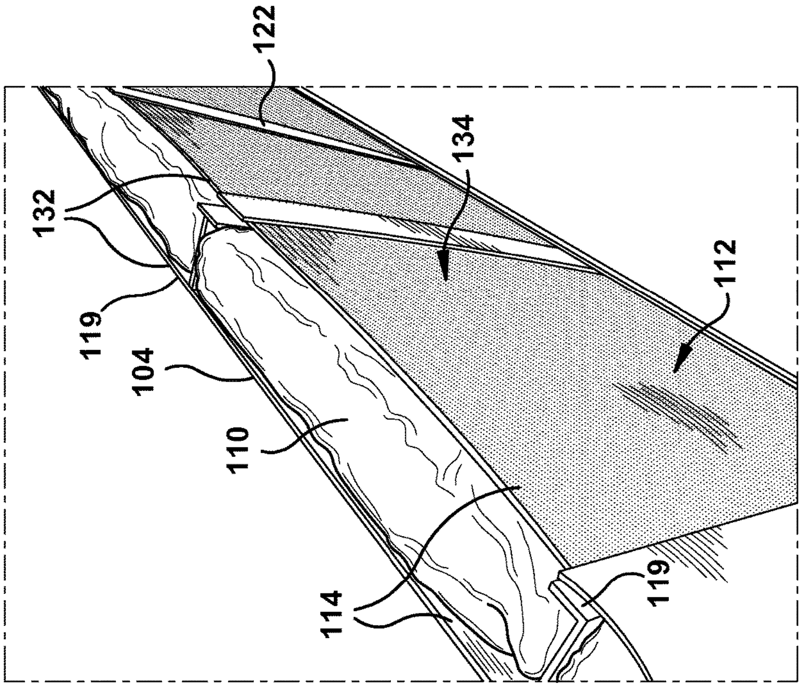
FIG. 4 shows an upper perspective view a single silencer panel according to embodiments of the disclosure with an end cap removed.
Figure 5:
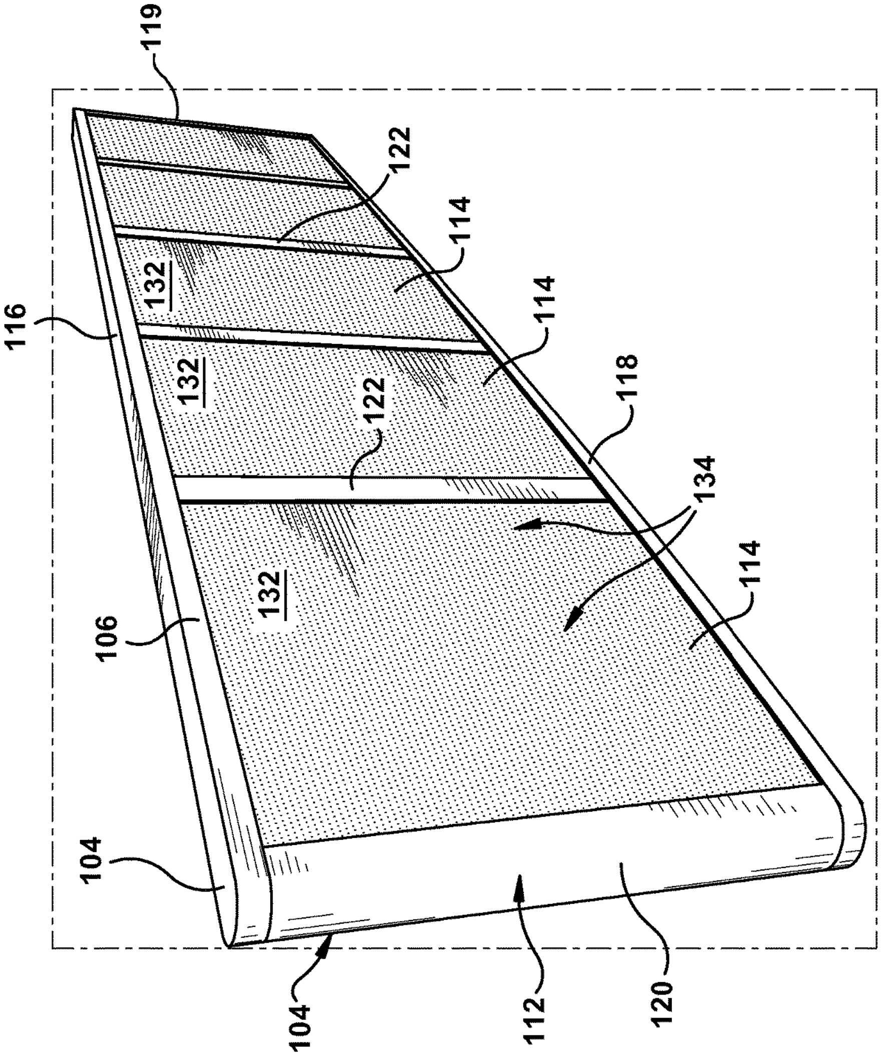
FIG. 5 shows a front perspective view of a silencer panel according to embodiments of the disclosure.

FIG. 4 shows an upper perspective view of a single silencer panel 104 with an end cap removed, and FIG. 5 shows a front perspective view of a whole single silencer panel 104. Referring to FIGS. 3-5, collectively, each silencer panel 104 includes an acoustic absorbing material 110 (FIG. 4 only) and an enclosure 112 surrounding acoustic absorbing material 110. Acoustic absorbing material 110 may include any now known or later developed sound absorbing material such as but not limited to at least one of: foam, mineral wool, rock wool and fiberglass. The foam may be reticulated, or otherwise called open cell foam. In contrast to conventional systems, enclosure 112 according to embodiments of the disclosure includes at least one plastic, perforated side wall 114. In addition, although not necessary in all instances, an upper and a lower end cap 116, 118 (FIG. 5) and side end cap 119 (FIGS. 4-5) of silencer panel 104 may also be made of the plastic. End caps 116, 118 include a panel shaped to enclose acoustic absorbing material 110 by overlapping and/or engaging side panels 114, and side end caps 119 also include a panel shaped to enclose acoustic absorbing material 110 by overlapping and/or engaging side panels 114. As an option, enclosure 112 may also include a plastic, rounded nose portion 120, but this may not be necessary in all instances. Nose portion 120 may also be made of other materials, such as stainless steel. As shown best in FIGS. 3 and 5, enclosure 112 may also optionally include a structural support 122 positioned between adjacent portions of side walls 114, where the side wall is optionally portioned. Each structural support 122 is made of the plastic, and has a shape and size to provide structural support to side walls 114. End caps 116, 118, side walls 114, nose portion 120 and/or structural supports 122 may be coupled together in any now known or later developed fashion, e.g., fasteners such as screws or nuts/bolts, interlocking snap engagement elements, threaded inserts, welding, etc. Each part can be made separately or parts can be formed together, e.g., using injection molding. The coupling mechanisms may also be made of plastic, if appropriate for the setting.

Figure 7:
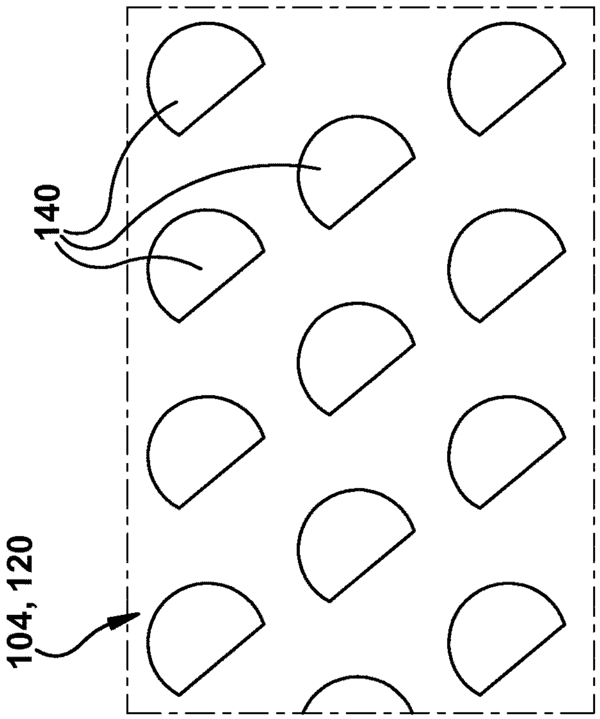
FIGS. 6-8 show views of various forms of perforations for the silencer panels according to embodiments of the disclosure.
Figure 6:
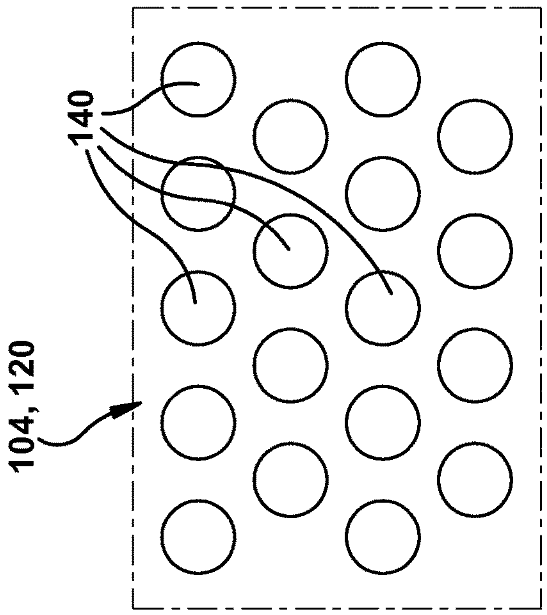
Figure 8:
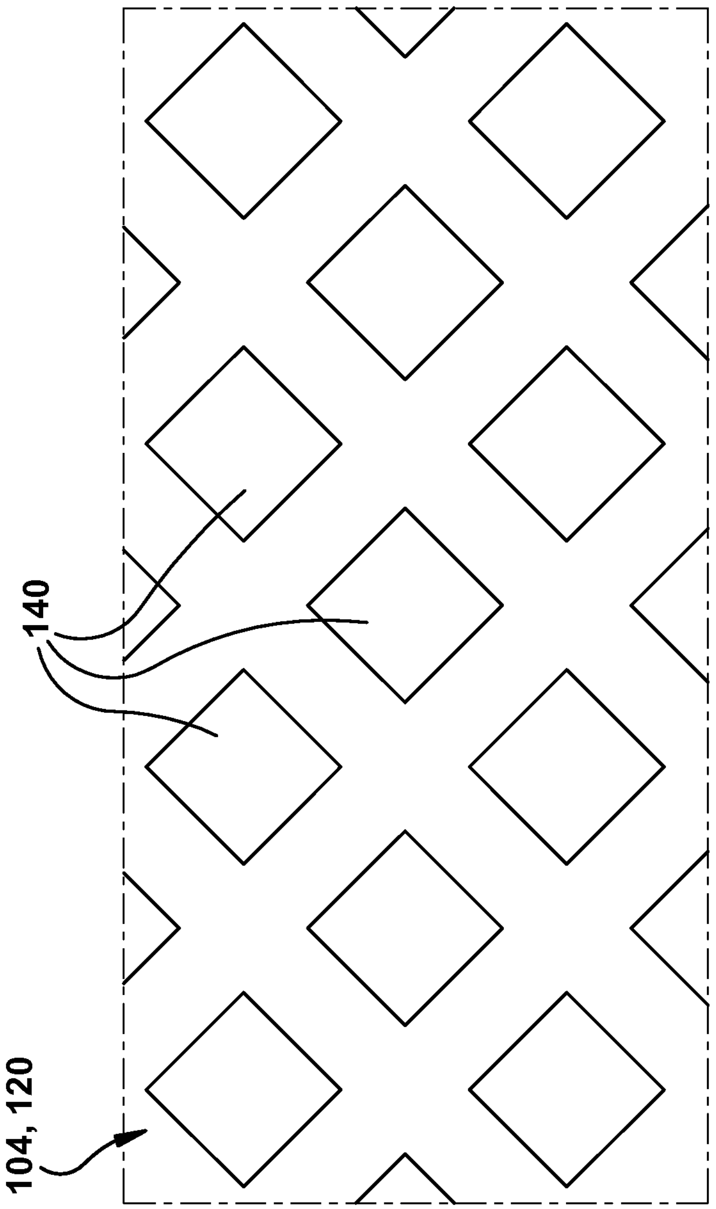

The plastic may include, for example, polyvinyl chloride (PVC), polypropylene(PP), polypropylene co-polymer (PPC), polypropylene homo-polymer (PPH), polyethylene (PE), high density polyethylene (HDPE) or any other plastic capable of withstanding the environmental and operational characteristics of the particular frame 102 (FIG. 3) and/or industrial machine in which the panel is employed. As shown in FIGS. 4 and 5 best, each plastic, perforated side wall 114 may include a planar sheet 132 of plastic having perforations 134 therein. As shown in FIG. 6, each perforation may take the form of a hole 140 extending through side wall 104. Alternatively, as shown in FIGS. 7 and 8, each perforation may include a different geometry of the openings (FIG. 7 and FIG. 8). Other shapes such as diamond, triangular, rectangular, etc. may also be possible.

Figure 9:
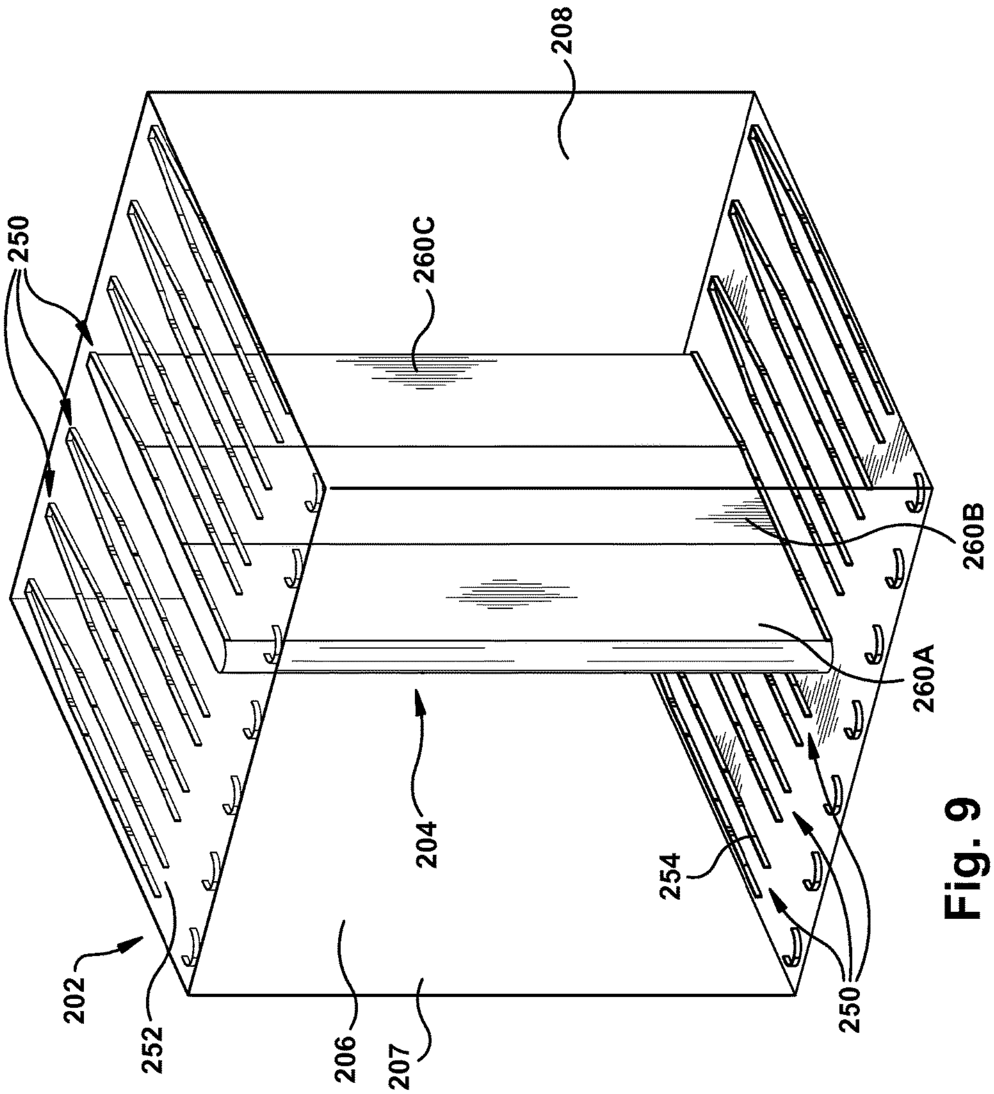
FIG. 9 shows a perspective view of a silencer duct employing a silencer panel according to an embodiment of the disclosure.

Referring to FIGS. 9-17, a silencer panel with sections and a related silencer duct are illustrated. Each embodiment may employ the afore-described teachings of using plastic in the silencer panels. FIG. 9 shows a perspective view of a silencer duct 202 employing a (modular) silencer panel 204 (only one shown) according to an embodiment of the disclosure. As will be described in greater detail herein, silencer duct 202 may include a frame 206 forming a working fluid flow path therethrough as described herein relative to FIG. 2. Frame 206 may include an upstream end 207 and a downstream end 208. Frame 206 may be made of any now known or later developed structural material such as steel, having sufficient strength to withstand the environment of the industrial machine in which it is used, and to hold a plurality of (modular) silencer panels 204. As will be described in further detail, a plurality of silencer panel mounts 250 may be positioned within frame 206, each silencer panel mount configured to slidingly receive a silencer panel 104, 204.

Figure 11:
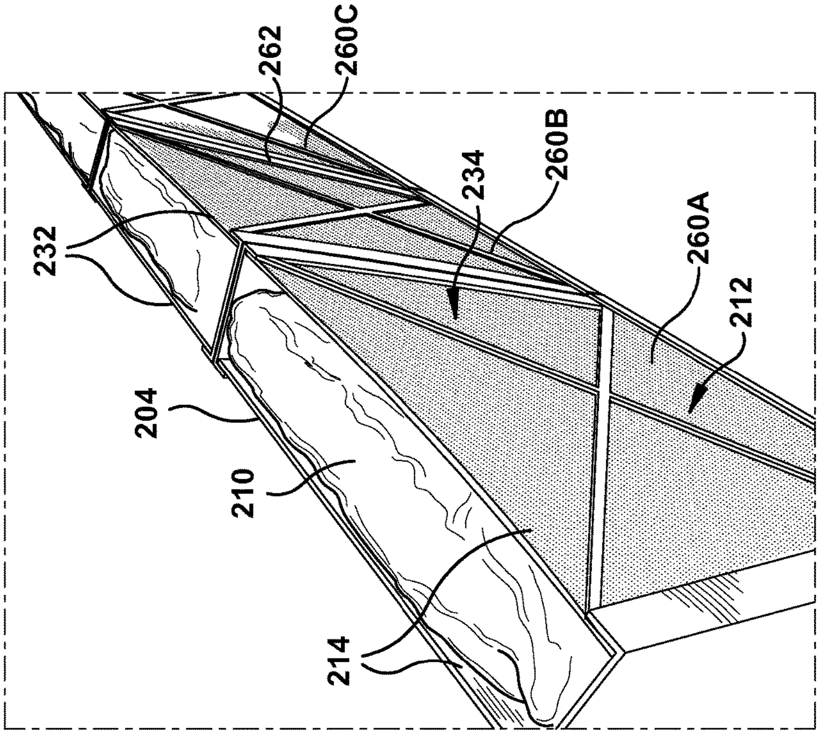
FIG. 11 shows an upper perspective view a single silencer panel including sections according to embodiments of the disclosure with an end cap removed.
Figure 10:
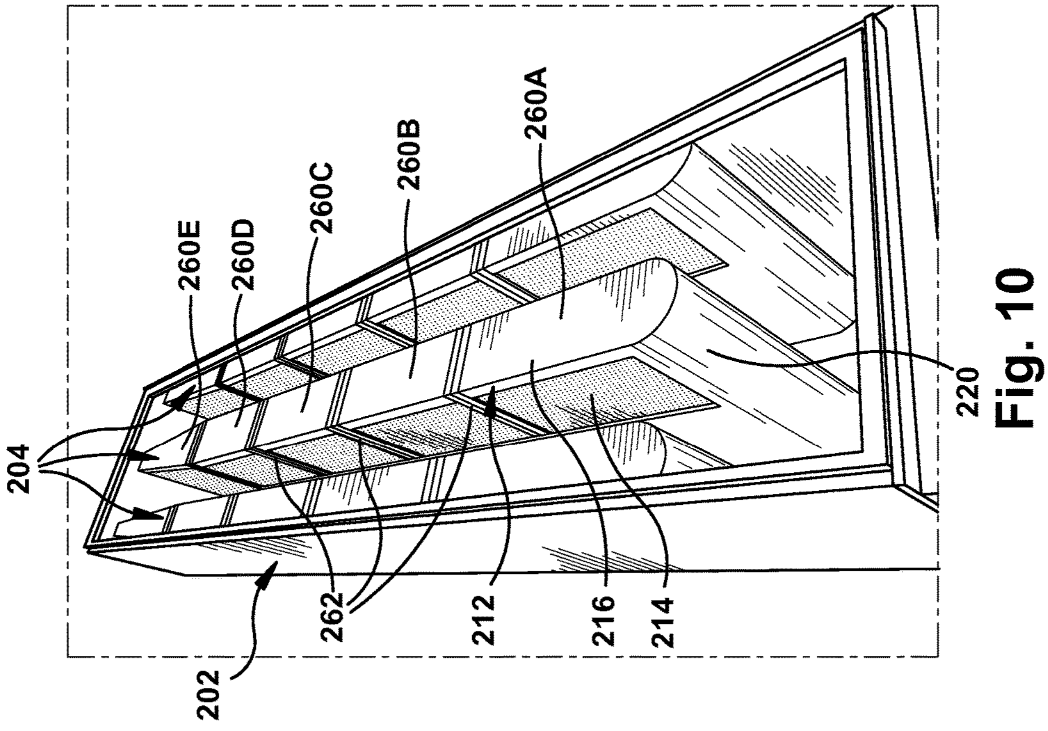
FIG. 10 shows an upper perspective view of a silencer panel according to embodiments of the disclosure in position in a silencer duct frame with an end panel of the frame removed to reveal the silencer panels.
Figure 12:
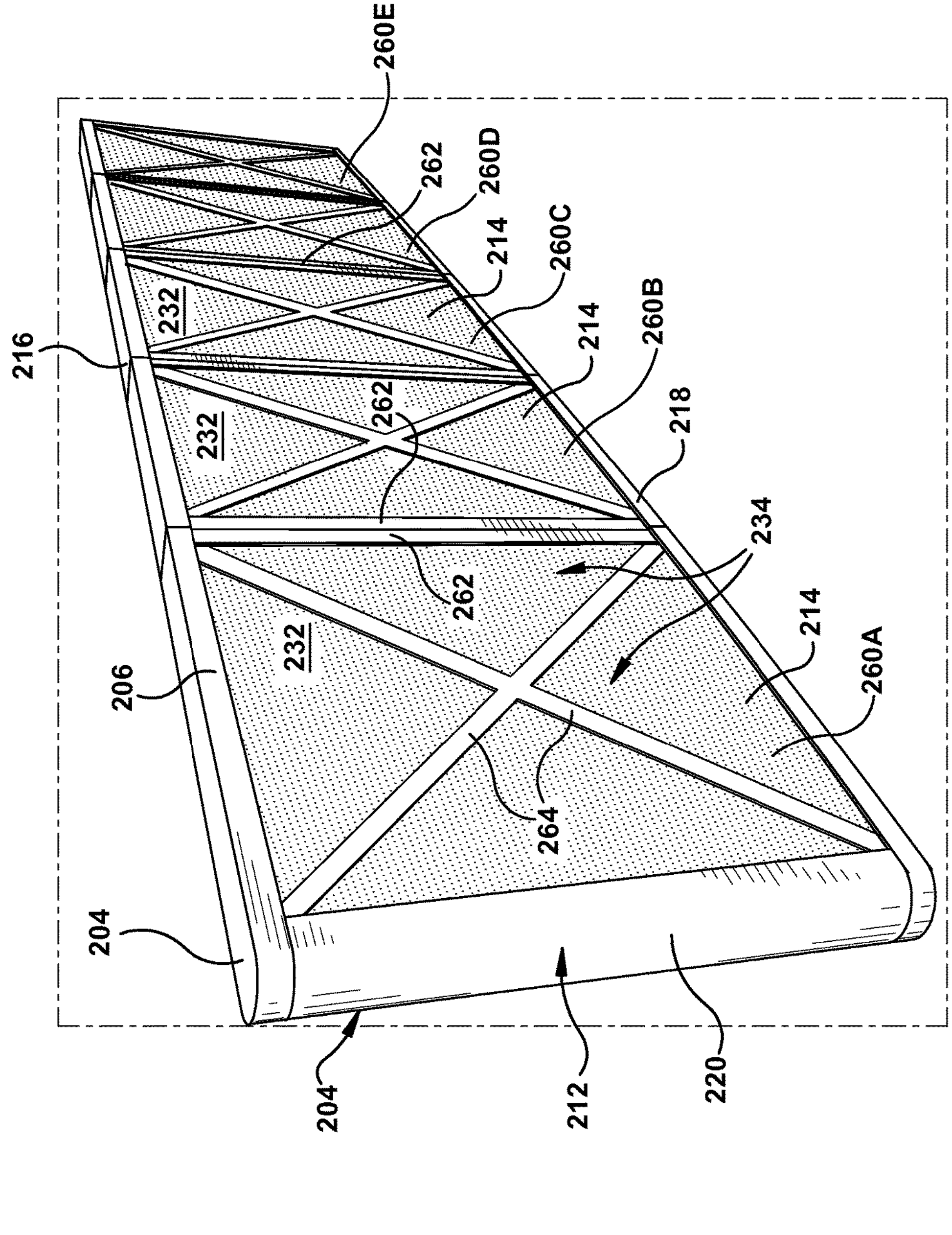
FIG. 12 shows a front perspective view of a silencer panel according to embodiments of the disclosure.
Figure 13:
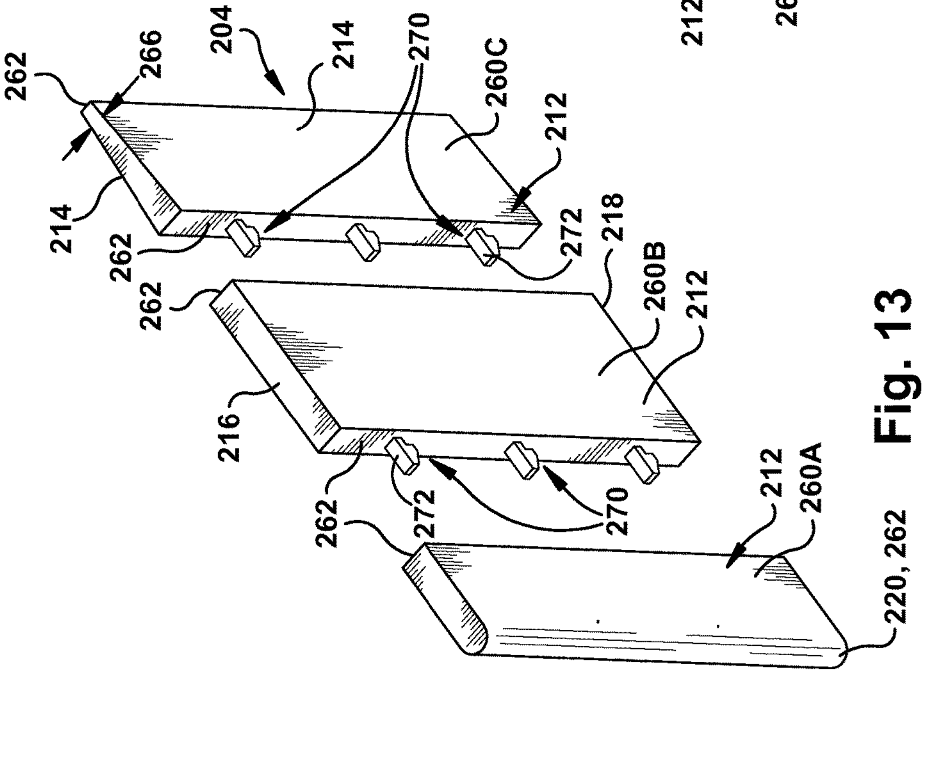
FIG. 13 shows an exploded perspective view of a silencer panel according to embodiments of the disclosure.

Referring to FIGS. 10-13, according to embodiments of the disclosure, in contrast to silencer panel 104 and conventional metal silencer panels, each silencer panel 204 may include a plurality of sections (modular sections) 260A, B, C, etc. configured to be coupled together to form a single silencer panel 204. Silencer panel 204 can be custom sized based on the size and number of sections used. In the figures, three sections 260A-C are shown in FIGS. 9, 11 and 13, and five sections 260A-E are shown in FIGS. 10 and 12. It is emphasized that any number of sections 260 may be employed, e.g., 2, 4, or more than 5, and each section can have the same or different dimensions, i.e., width, length, height, depending on the application. In any event, as shown best in FIGS. 10-12, each section 260 includes an acoustic absorbing material 210 within an enclosure 212, which surrounds acoustic absorbing material 210. Acoustic absorbing material 210 may include any material listed herein for material 110. First enclosure 212 according to embodiments of the disclosure may include a pair of opposing side walls 214, a pair of opposing end walls 216 and upper and lower end caps 216, 218. At least one side wall 214 may be perforated plastic, as described relative to walls 114. Each plastic, perforated side wall 214 may include a planar sheet 232 of plastic having perforations 234 therein, and may take any of the form as described herein relative to FIGS. 6-8. In addition, although not necessary in all instances, an upper and a lower end cap 216, 218 (FIG. 12) of silencer panel 204 may also be made of the plastic, which may include any of the listed plastics herein for side walls 114. End caps 216, 218 include a panel shaped to enclose acoustic absorbing material 210 by overlapping and/or engaging side walls 214.

As shown best in FIGS. 10 and 13, and in contrast to silencer panel 104 described herein, pair of opposing end walls 262 (located where support structures 122 are in FIGS. 3-5) form the sections 260. Each end wall 262 may be made of the same plastic as side walls 214, and has a shape and size to provide structural support to side walls 214. As shown best in FIG. 12, at least one enclosure may further include at least one stiffener 264 positioned between adjacent end walls 262. Stiffeners 264 may be made of any material capable of providing sufficient support, e.g., metal or plastic.

Referring to FIG. 13, as an option, one section (e.g., 260C in FIG. 13) that is positioned as the trailing-most section relative to a flow of a working fluid may include a tapered trailing portion 266 at an end of a pair of adjacent side walls 214 thereof. In this setting, side walls 214 are closer together at a trailing edge than at a leading edge of the particular section 262C. As another option, also shown in FIG. 13, an end wall 262 of a leading edge section 260A may take the form of a plastic, rounded nose portion 220. That is, a rounded nose portion 220 is positioned at an end of a pair of adjacent side walls 214 of enclosure 212 of a leading edge section 260A. Alternative, a separate nose section 220 could be added to a planar end wall 262A. In any event, nose portion 220 may be made of plastic, like walls 214, or other materials, such as stainless steel. End caps 216, 218, side walls 214, nose portion 220, end walls 262 and/or stiffeners 264 may be coupled together in any now known or later developed fashion, e.g., fasteners such as screws or nuts/bolts, interlocking snap engagement elements, threaded inserts, welding, etc. The parts may be made separately or parts may be made integrally, e.g., using injection molding. The coupling mechanisms may also be made of plastic, if appropriate for the setting.

Figure 14:
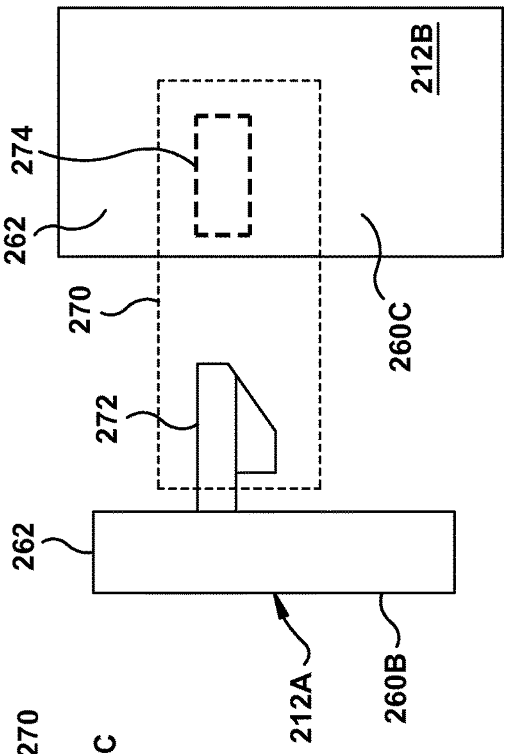
FIG. 14 shows a detail view of an illustrative coupler employed with the sections.

Referring to FIG. 14, each section 260A, 260B, etc., includes a first coupler 270 (parts shown in phantom box) configured to couple an enclosure 212A thereof to a second enclosure 212B of an adjacent silencer panel section 260B, 260C, etc. While the example in FIG. 14 shows section 260B ready for coupling to section 260C, the teachings are applicable to all of the sections. First coupler 270 may include any now known or later developed mechanism for fixedly coupling sections 260 together, either permanently or temporarily, such that they can withstand the operational environment of the industrial machine in which they are employed. In the example shown, first coupler 270 includes a male coupler 272 on one of the first and second enclosures 212, e.g., of a section 260B, configured to mate with a female coupler 274 on the other of the first and second enclosures 212, e.g., on section 260C. Although shown as a toothed tab 272 and complementary opening 274, any variety of male-female coupling could be employed. So that a number of sections 260 can be positioned serially, as shown best in FIG. 13, each silencer module section 260 may also include a second coupler 270, identical to the first coupler, configured to couple the enclosure, e.g., of section 260B, to a third enclosure 212 of another adjacent silencer panel section, e.g., 260A. Opposing end walls 262 may include complementary couplers 272, 274 to accommodate serial connections of sections 260. Leading edge and trailing edge sections, e.g., 260A, 260C in FIG. 13, may have couplers 270 only on one end. It is emphasized that coupler 270 may take a large variety of forms which may or may not be integrated into enclosures 212. For example, coupler 270 could include but is not limited to: snap-fit connections, hook-and-loop fasteners, bolts/nuts, tongue-and-groove fasteners, adhesive, coupling brackets attached to side walls 214, end caps 216 and/or end caps 218 of adjacent sections, etc.

Figure 15:
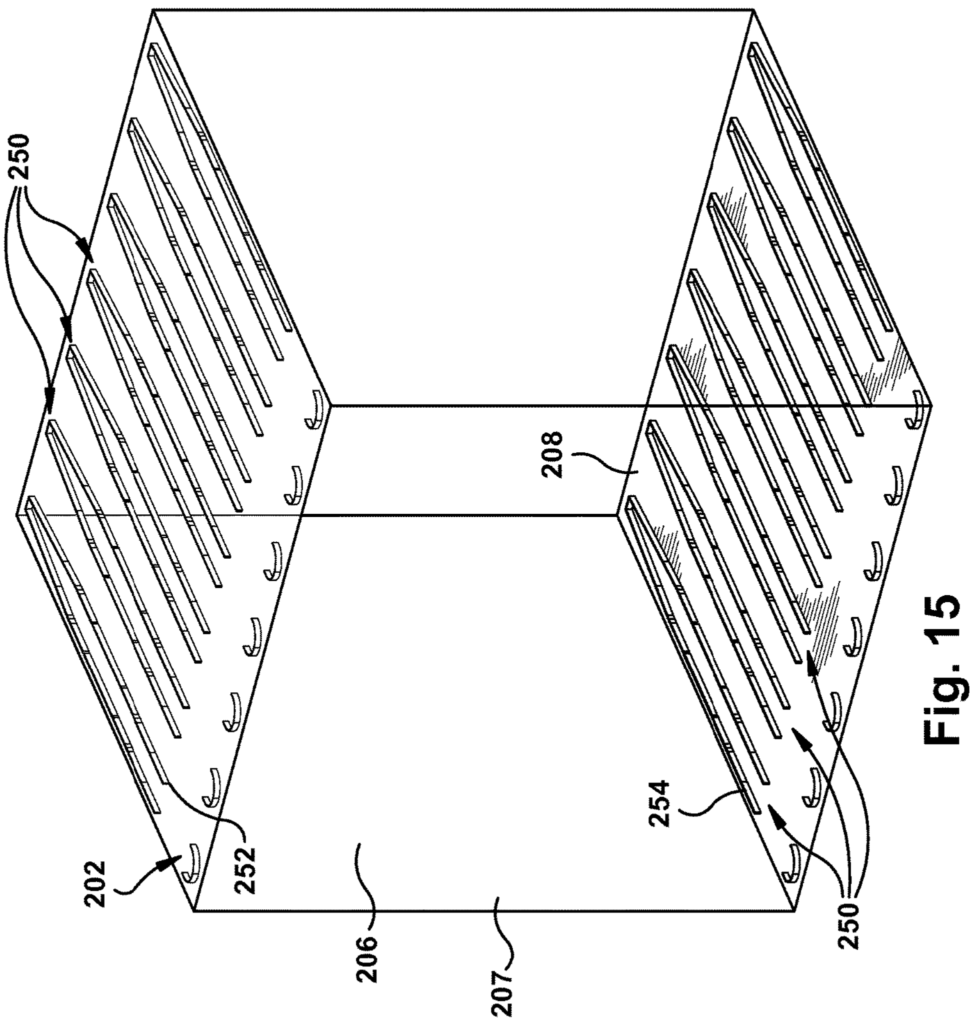
FIG. 15 shows a perspective view of a silencer duct with the silencer panels removed according to an embodiment of the disclosure.
Figure 16:
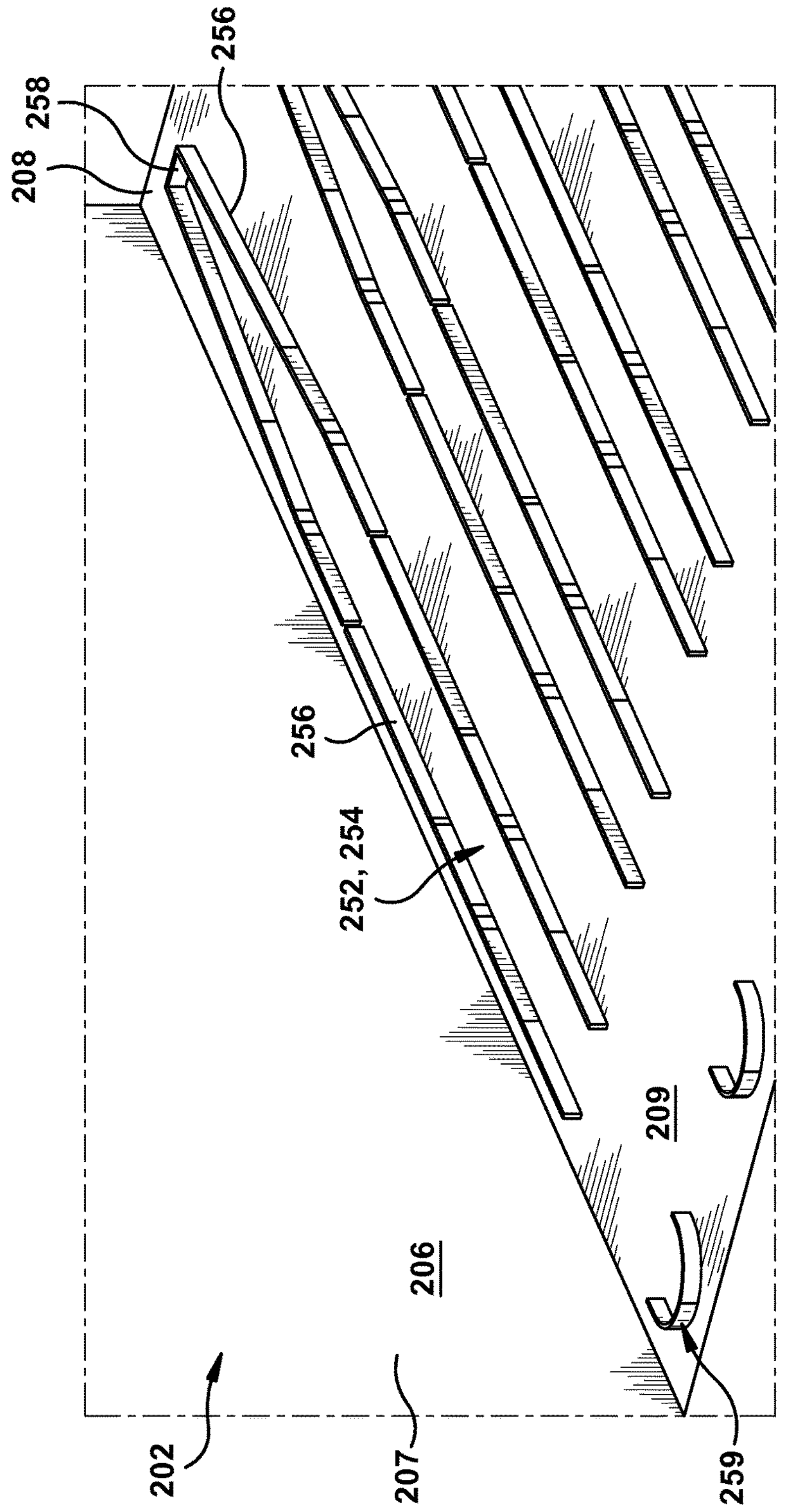
FIG. 16 shows an enlarged perspective view of a silencer panel mount including grooves for mounting silencer panels in the silencer duct according to an embodiment of the disclosure.
Figure 17:
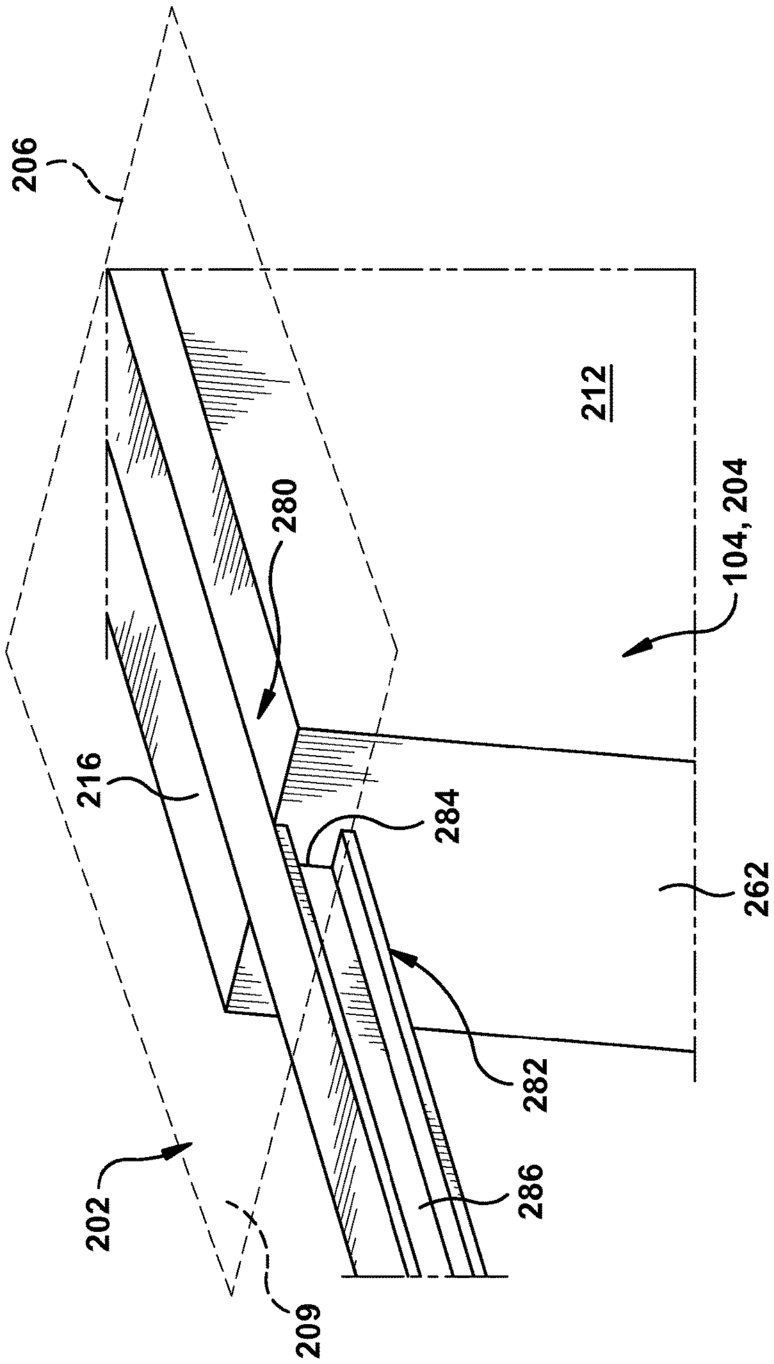
FIG. 17 shows an enlarged perspective view of an alternative embodiment of a silencer panel mount for mounting silencer panels according to embodiments of the disclosure.

Returning to FIG. 9 in conjunction with FIGS. 15-17, in contrast to conventional systems, each silencer panel 104, 204 is configured to be slidingly positioned in a silencer panel frame 206 of a silencer duct 202. In order to provide support, silencer duct 202, as noted previously, may include a plurality of silencer panel mounts 250 positioned within frame 206, where each silencer panel mount is configured to slidingly receive a silencer panel 104, 204. This structure is also in contrast to conventional systems in which each silencer panel is custom fit metal that is welded into the duct.

Silencer panel mounts 250 may take a variety of forms. In one embodiment, shown in FIGS. 9, 15 and 16, each silencer panel mount 250 includes a pair of grooves 252, 254 in opposing relation on frame 206. Grooves 252, 254 are each configured to positionally engage, i.e., prevent movement of, a respective end of a silencer panel therein. Each groove can accommodate a silencer panel such as silencer panel 104 (FIGS. 3-5), silencer panel 204 (FIGS. 10-13) or even a conventional metal clad panel. Grooves 252, 254 can be structured in a number of ways. In one example, shown best in FIG. 16, each groove 252, 254 may include a pair of plates 256 extending from an interior surface 209 of frame 206. In the example shown, silencer panels 204 are arranged in a vertical configuration, so interior surface 209 includes a top and/or bottom horizontal surface of frame 206. Although not ideal, it is feasible to provide silencer panels in a horizontal fashion. Each groove 252, 254 may also include a closed end

258 at a downstream end of frame 206 to axially position silencer panel 104, 204. In this fashion, silencer panel 104, 204 can be slid into opposing grooves 252, 254 and held in place by the force of working fluid from an upstream end of frame 206. Alternatively, as shown in FIGS. 9 and 16, a lock 259 configured to prevent removal of a silencer panel 104, 204 from a respective groove 252, 254 may be provided. Lock 259 can be permanent or removable. Lock 259 can take any of a variety of forms such as but not limited to: a threaded fastener into surface 209, a movable hinged or sliding member that engages a leading edge of section 260A, etc. Lock 259 can be optionally shaped to accommodate a leading edge of the leading section, e.g., 260A in FIG. 13, e.g., rounded as nose portion 220.

Turning to FIG. 17, in an alternative embodiment, enclosures 112, 212 of silencer panel 104, 204, respectively, may include a mount 280 for slidingly positioning a single silencer panel 104, 204 in frame 206. Where a (modular) silencer panel 204 is employed, each enclosure 212 thereof may include mount 280, e.g., aligned thereon. In one embodiment, silencer panel mounts 250 and mount 280 may include a mating male-female sliding coupler 282. In one embodiment, the mating male-female sliding coupler may take the form of a rail and complementary groove. In this example, a first portion 284 of mating male-female sliding coupler, e.g., mount 280 as a groove 284, is configured to mate with a second portion 286, e.g., a rail, of the mating male-female sliding coupler on silencer panel frame 206. In the example shown, first portion 284 (mount 280) may be positioned on an upper and/or a lower end cap 216, 218 (216 as shown) and second portion 286 is positioned on interior surface 209 of frame 206. In the example shown, male-female portions take the form of an I-beam 286 and a complementarily-shaped groove 284 in end cap 216. It is emphasized that the male-female portions may be switched and take a variety of other shapes, for example, dovetail-shaped, T-shaped, L-shaped, etc. In any event, portions 284, 286 can readily slide together to position a silencer panel 104, 204 in frame 206. Any variety of locks and/or stops to axially position the panel can be employed.

Enclosures 112, 212 made of perforated, plastic side walls 114, 214 provides a number of advantages over conventional steel panels. For example, silencer panels 104, 204 have reduced weight and are easier to handle, have reduced cost, and are easier to fabricate because of the elimination of extensive welding between sheets and supporting members. In addition, the plastic may provide slightly enhanced acoustic performance (e.g., a higher decibel (dB) attenuation of approximately, for example, 2 dB or above overall attenuation), and may allow increased perforation areal opening percentages compared to steel panels. In addition, embodiments of silencer panel 204 allows for readily customizing a size of a silencer panel to accommodate a wide variety of different sized frames. Silencer duct 206, as described herein, allows positioning of silencer panels 104, 204 and conventional metal panels, without having to weld them in place, saving time and manufacturing costs.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A silencer panel section, comprising:
- an acoustic absorbing material;
- a first enclosure surrounding the acoustic absorbing material; and
- a first coupler configured to releasably couple the first enclosure to a second enclosure of an adjacent silencer panel section.

2. The silencer panel section of claim 1, wherein the first coupler includes a male coupler on one of the first and second enclosures configured to mate with a female coupler on the other of the first and second enclosures.

3. The silencer panel section of claim 1, further comprising a second coupler configured to couple the first enclosure to a third enclosure of another adjacent silencer panel section.

4. The silencer panel section of claim 1, wherein the first enclosure further includes a pair of opposing side walls, a pair of opposing end walls and an upper and a lower end cap.

5. The silencer panel section of claim 4, wherein at least one of the upper and lower end cap includes a first portion of a mating male-female sliding coupler configured to mate with a second portion of the mating male-female sliding coupler on a silencer panel frame.

6. The silencer panel section of claim 4, wherein the first enclosure further includes at least one stiffener positioned between adjacent end walls.

7. The silencer panel section of claim 1, wherein the first enclosure includes a tapered trailing portion at an end of a pair of adjacent side walls thereof.

8. The silencer panel section of claim 1, wherein the first enclosure includes a rounded nose portion at an end of a pair of adjacent side walls thereof.

9. The silencer panel section of claim 1, wherein the enclosure includes at least one plastic, perforated side wall.

10. The silencer panel section of claim 9, wherein a plastic of the at least one plastic, perforated side wall is chosen from the group consisting of: polyvinyl chloride (PVC), polypropylene(PP), polypropylene co-polymer (PPC), polypropylene homo-polymer (PPH), polyethylene (PE) and high density polyethylene (HDPE).

11. A silencer panel comprising:
- a plurality of sections configured to be releasably coupled together to form a single silencer panel, each section including an acoustic absorbing material within an enclosure surrounding the acoustic absorbing material.

12. The silencer panel of claim 11, wherein each section further including a first coupler configured to couple the enclosure to another enclosure of an adjacent section.

13. The silencer panel of claim 12, further comprising a second coupler configured to couple the enclosure to the enclosure of yet another adjacent section.

14. The silencer panel of claim 12, wherein the first coupler includes a male coupler on one of the enclosures configured to mate with a mating female coupler on the other of the enclosures.

15. The silencer panel of claim 11, wherein each enclosure further includes a pair of opposing side walls, a pair of opposing end walls and an upper and a lower end cap.

16. The silencer panel of claim 15, wherein at least one of the upper and lower end cap includes a first portion of a mating male-female sliding coupler configured to mate with a second portion of the mating male-female sliding coupler on a silencer panel frame.

17. The silencer panel of claim 15, wherein at least one enclosure further includes at least one stiffener positioned between adjacent end walls.

18. The silencer panel of claim 11, wherein the single silencer panel includes a mount for slidingly positioning the single silencer panel in a silencer panel frame.

19. The silencer panel of claim 11, wherein one of the plurality of sections includes a tapered trailing portion at an end of a pair of adjacent side walls of the enclosure thereof.

20. The silencer panel of claim 11, wherein one of the plurality of sections includes a rounded nose portion at an end of a pair of adjacent side walls of the enclosure thereof.

21. The silencer panel of claim 11, wherein each enclosure includes at least one plastic, perforated side wall.

22. The silencer panel of claim 21, wherein a plastic of the at least one plastic, perforated side wall is chosen from the group consisting of: polyvinyl chloride (PVC), polypropylene(PP), polypropylene co-polymer (PPC), polypropylene homo-polymer (PPH), polyethylene (PE) and high density polyethylene (HDPE).

23. A silencer duct comprising:

a frame forming a working fluid flow path; and a plurality of silencer panel mounts positioned within the frame and configured to slidingly receive a silencer panel, each silencer panel mount including:

a pair of grooves in opposing relation on the frame, each groove including a closed end at a downstream end of the frame to axially position the silencer panel; and at least one lock positioned upstream and separate from at least one of the pair of grooves, the lock configured to prevent removal of a silencer panel from a respective groove.

24. The silencer duct of claim 23, wherein each groove of the pair of grooves configured to positionally engage a respective end of the silencer panel therein.

25. The silencer duct of claim 24, wherein each groove includes a pair of plates extending from an interior surface of the frame.

26. The silencer duct of claim 23, wherein the silencer panel mount includes a first portion of a mating male-female sliding coupler configured to mate with a second portion of the mating male-female sliding coupler on the silencer panel.

27. The silencer duct of claim 26, wherein the silencer panel includes:

a plurality of sections configured to be coupled together to form a single panel, each section including an acoustic absorbing material within an enclosure surrounding the acoustic absorbing material, and wherein each enclosure includes the second portion of the mating male-female sliding coupler.

28. The silencer duct of claim 27, wherein each enclosure includes a pair of opposing side walls, a pair of opposing end walls and an upper and a lower end cap, and at least one of the upper and lower end cap includes the second portion of the mating male-female sliding coupler.

* * * * *